US009194977B1

(12) United States Patent  (10) Patent No.: US 9,194,977 B1
Dungan et al.  (45) Date of Patent: Nov. 24, 2015

(54) ACTIVE RESPONSE GRAVITY OFFLOAD AND METHOD

(71) Applicant: The United States of America as represented by the Administrator of the National Aeronautics and Space, Washington, DC (US)

(72) Inventors: Larry K. Dungan, League City, TX (US); Paul S. Valle, Seabrook, TX (US); Derek R. Bankieris, League City, TX (US); Asher P. Lieberman, Las Cruces, NM (US); Lee Redden, Palo Alto, CA (US); Cecil Shy, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 291 days.

(21) Appl. No.: 13/951,671

(22) Filed: Jul. 26, 2013

(51) Int. Cl.
*B64G 7/00* (2006.01)
*A63B 69/00* (2006.01)
*B66C 13/06* (2006.01)
*G01V 7/00* (2006.01)
*G01C 1/00* (2006.01)
*G01C 25/00* (2006.01)
*G01V 13/00* (2006.01)

(52) U.S. Cl.
CPC . *G01V 7/00* (2013.01); *B66C 13/06* (2013.01); *G01C 1/00* (2013.01); *G01C 25/00* (2013.01); *G01V 13/00* (2013.01)

(58) Field of Classification Search
CPC .... A61H 1/0229; A63B 69/0064; B64G 7/00; B66C 13/06; B66C 13/04; B66C 17/00
See application file for complete search history.

(56) References Cited

U.S. PATENT DOCUMENTS

| 3,010,220 | A | * | 11/1961 | Schueller | 434/34 |
| 3,161,968 | A | * | 12/1964 | De Boy et al. | 434/34 |
| 3,270,441 | A | * | 9/1966 | Hewes et al. | 434/255 |
| 3,281,964 | A | * | 11/1966 | Hewes | 434/34 |
| 3,330,052 | A | * | 7/1967 | Johnson et al. | 434/255 |
| 3,516,179 | A | * | 6/1970 | Dane | 434/34 |
| 3,701,528 | A | * | 10/1972 | Ryan | 472/131 |
| 3,900,195 | A | * | 8/1975 | Preston | 482/148 |
| 3,912,260 | A | * | 10/1975 | Rice | 482/4 |
| 4,860,600 | A |  | 8/1989 | Schumacher |  |
| 4,883,184 | A | * | 11/1989 | Albus | 212/274 |

(Continued)

FOREIGN PATENT DOCUMENTS

CN  101482455 A * 7/2009
CN  102009749 A * 4/2011

(Continued)

*Primary Examiner* — David A Rogers
(74) *Attorney, Agent, or Firm* — Theodore U. Ro

(57) ABSTRACT

A variable gravity field simulator can be utilized to provide three dimensional simulations for simulated gravity fields selectively ranging from Moon, Mars, and micro-gravity environments and/or other selectable gravity fields. The gravity field simulator utilizes a horizontally moveable carriage with a cable extending from a hoist. The cable can be attached to a load which experiences the effects of the simulated gravity environment. The load can be a human being or robot that makes movements that induce swinging of the cable whereby a horizontal control system reduces swinging energy. A vertical control system uses a non-linear feedback filter to remove noise from a load sensor that is in the same frequency range as signals from the load sensor.

31 Claims, 12 Drawing Sheets

(56) References Cited

U.S. PATENT DOCUMENTS

| | | | |
|---|---|---|---|
| 5,197,341 A * | 3/1993 | Steeves | 73/865.3 |
| 5,379,657 A | 1/1995 | Hasselman et al. | |
| 5,568,189 A * | 10/1996 | Kneller | 348/144 |
| 5,823,511 A * | 10/1998 | Hall et al. | 254/264 |
| 6,345,724 B1 * | 2/2002 | Masumoto et al. | 212/173 |
| 6,566,834 B1 | 5/2003 | Albus et al. | |
| 6,743,019 B2 | 6/2004 | Ransom et al. | |
| 7,043,337 B2 * | 5/2006 | Colgate et al. | 700/213 |
| 7,088,071 B2 * | 8/2006 | Rodnunsky | 318/649 |
| 7,199,790 B2 | 4/2007 | Rosenberg et al. | |
| 7,753,642 B2 * | 7/2010 | Bosscher et al. | 414/735 |
| 8,152,699 B1 | 4/2012 | Ma et al. | |
| 8,985,354 B2 * | 3/2015 | Lecours et al. | 212/276 |
| 2003/0153438 A1 * | 8/2003 | Gordon et al. | 482/92 |
| 2004/0026349 A1 * | 2/2004 | Colgate et al. | 212/284 |
| 2005/0103738 A1 * | 5/2005 | Recktenwald et al. | 212/275 |
| 2010/0201970 A1 * | 8/2010 | Pellen | 356/138 |
| 2010/0279255 A1 | 11/2010 | Williams, II | |
| 2011/0088586 A1 | 4/2011 | Huang et al. | |
| 2012/0238921 A1 * | 9/2012 | Kuehne et al. | 601/5 |
| 2013/0213919 A1 * | 8/2013 | Kyllingstad | 212/272 |
| 2014/0124300 A1 * | 5/2014 | Benosman | 187/247 |
| 2014/0224755 A1 * | 8/2014 | Eriksson et al. | 212/273 |
| 2014/0264209 A1 * | 9/2014 | Lin | 254/266 |

FOREIGN PATENT DOCUMENTS

| | | | | |
|---|---|---|---|---|
| CN | 104118580 A | * | 10/2014 | |
| CN | 203975239 U | * | 12/2014 | |
| JP | 3213500 | | 9/1991 | |
| JP | 05261685 A | * | 10/1993 | B25J 13/08 |
| SU | 450090 A | * | 5/1975 | |
| WO | WO 2006054712 A1 | * | 5/2006 | |

* cited by examiner

Equation 11.1: $f_{loose}[k] = \alpha_{loose}(f_{act}[k] - \gamma_{loose}\delta[k]) + (1 - \alpha_{loose})f_{loose}[k-1]$ Equation 11.2: $f_{tight}[k] = \alpha_{tight}(f_{act}[k] - \gamma_{tight}\delta[k]) + (1 - \alpha_{tight})f_{tight}[k-1]$ wherein:

$f_{loose}$ represents said first output of said first filter, $f_{tight}$ represents said second output of said second filter, $f_{act}$ represents said load sensor signal,

*α- represents an exponential moving average filter coefficient,*
*γ- represents a rate of change gain factor,*
*δ- represents said rate of change, and*
*k- represents a discrete time step.*

FIG. 11

Equation 12.1: $f_{ATF} = (1 - \alpha_{AF}[k])f_{loose}[k] + \alpha_{AF}[k]f_{tight}[k]$ wherein, Equation 12.2: $\alpha_{AF}[k] = (y)\dfrac{d_{filter}[k] + \frac{v_{filter}[k]}{\beta_1 + d_{filter}[k]}}{1 + \frac{v_{filter}[k]}{\beta_1 + d_{filter}[k]} + \beta_2 d_{filter}[k]} + (1-y)\alpha_{AF}[k-1]$, wherein $y$ $(0 < y \leq 1)$, wherein $\beta_1$ $(\beta_1 > 1)$ and $\beta_2$ $(0 < \beta_2 < 1)$, wherein, Equation 12.3: $d_{filter}[k] = |f_{loose}[k] - f_{tight}[k]|$ Equation 12.4: $v_{filter}[k] = b_3(|(|f_{loose}[k] - f_{loose}[k-12]|) - (|f_{tight}[k] - f_{tight}[k-12]|)|) + (1-b_3)(v_{filter}[k-1])$, and wherein $b_3 < 1$.

FIG. 12

$$u = KmL\omega(\cos\theta) + K_p L \sin\theta + K_d \dot{e}$$

wherein:

$u$ = represents a control variable, $K$, $K_p$, and $K_d$ represent a predetermined first, second, and third constant, respectively, $m$ = represents a mass of said load, $L$ = represents a or said length of said cable, $\theta$ = represents an or said angle of said cable with respect to said z axis, $\omega$ = represents an angular velocity, and $\dot{e}$ = represents a derivative of $L \sin\theta$.

FIG. 13

ACTIVE RESPONSE GRAVITY OFFLOAD AND METHOD

STATEMENT OF GOVERNMENT INTEREST

The invention described herein was made by employee(s) of the United States Government and may be manufactured and used by or for the Government of the United States of America for governmental purposes without the payment of any royalties thereon or therefor.

BACKGROUND OF THE INVENTION

1. Field of the Invention

The present invention relates generally to gravity simulation systems and, more specifically, to an active response gravity offload system and method for performing reduced gravity testing with robotic systems and humans.

2. Background of the Invention

Various types of reduced gravity or microgravity systems have been used in the past, some of which are discussed below. These systems may provide helpful results in certain ways but are limited in other ways.

The National Aeronautics and Space Administration (NASA) has utilized a number of different types of gravity simulation systems. A Reduced Gravity Simulator utilized at Langley Research Center suspended an astronaut at an angle of 80.5 degrees so that only $\frac{1}{6}^{th}$ of their weight was supported by the ground while the rest was supported by a pulley system. The Reduced Gravity Simulator only allowed motion in one dimension and the pulleys were uncomfortable and were not able to support every part of the body.

Another system, a partial gravity simulator (POGO), utilized an air controlled piston along with air bearings and gimbals to simulate reduced gravity. POGO used an air-bearing rail to allow for maneuverability in two dimensions. POGO was used to train astronauts how to use tools and other hardware in reduced gravity. POGO, although adding another dimension for motion, induced significant inertial loads on the users. The friction within the system along with the mass, created for less than perfect simulations. Also, the system did not match the dynamics of the person moving and limited their range of motion.

It was found that reduced gravity could be simulated on an airplane flying parabolic trajectories. Using a C-9 aircraft, Lunar, Martian, and microgravity can each be simulated. Some of the downsides to this method include: (1) limited space within the aircraft to move around, (2) simulated environments are only possible for 20-30 second intervals, (3) cost, and (4) the accuracy of the simulated gravity is dependent upon the precision in which the parabolas are flown.

More recently, a first generation Active Response Gravity Offload System (ARGOS) system has been used by NASA. This system utilized a moveable beam in a framework with a winch that supports a cable. The system allows movement in three dimensions. The first generation frame was limited in size but did provide useful simulations. While the first generation ARGOS system showed the concept is viable for use with a larger frame than used in the first generation ARGOS system, numerous problems were apparent for both the vertical and horizontal control systems that would potentially limit the realism of the simulation. The smaller frame of the first generation system effectively hid some problems that become more apparent with a larger framework.

In the vertical control system, for example, force data from a commercial off the shelf (COTS) analog load cell is placed in-line on the lifting cable as the primary feedback device for the vertical system. There are many sources of noise in the load cell data, which impact the resolution and fine control capability of the system. These sources of noise include electronic noise in the load cell, physical vibrations from the hoist gear train, vibrations from the horizontal system, and vibrations from the test participant attached to the system. Many of these sources of noise reside in the same frequency range that the system controls, rendering conventional noise filtering techniques unhelpful. In addition, the ARGOS system should respond fairly quickly to the pertinent signal, while filtering the noise, and cannot tolerate a large amount of response lag, which can cause the system to lose stability.

For the horizontal control system of the first generation ARGOS system, the control input was feedback from a cable angle laser sensor. The control output was an acceleration command to the motor controller, which commands x and y horizontal motors to move in a predetermined x and y axis, respectively. While the first generation ARGOS framework was relatively small and the control motors were relatively slow, unrealistic swinging motion can occur in a frame that is considerably larger than the first generation system, especially in response to human loads that jump or move. The angle laser sensor itself can introduce bias if the cable does not remain perfectly centralized from the control motor. Moreover, the system supports not only objects but also human beings that may jump or otherwise create complex acceleration and velocity vectors that induce swinging motion of the lifting cable. While current literature discusses moving swinging pendulum systems, which in the current literature can be referred to cart-pendulum system, suitable solutions to the aforementioned problems of the first generation ARGOS system are not found in the prior art.

The following prior art references disclose various gravity and suspension systems but do not address the problems discussed hereinbefore:

U.S. Pat. No. 8,152,699 issued Apr. 10, 2012 to Ma, et al. discloses an apparatus and method for gravity-balanced apparatuses for training humans for space exploration and other applications. The present invention is statically-balanced and comprises a spring apparatus that is adjusted. An embodiment of the present invention provides an apparatus and method for simulating walking in a zero-gravity or reduced-gravity environment.

U.S. Pat. No. 7,199,790 issued Apr. 3, 2007 to Rosenberg, et al. discloses a method and apparatus for providing force feedback to a user operating a human/computer interface device in conjunction with a graphical user interface (GUI) displayed by a host computer system. A physical object, such as a joystick or a mouse, controls a graphical object, such as a cursor, within the GUI. The GUI allows the user to interface with operating system functions implemented by the computer system. A signal is output from the host computer to the interface device to apply a force sensation to the physical object using one or more actuators. This desired force sensation is associated with at least one of the graphical objects and operating system functions of the graphical user interface and is determined by a location of the cursor in the GUI with respect to targets that are associated with the graphical objects. The graphical objects include icons, windows, pull-down menus and menu items, scroll bars ("sliders"), and buttons. The force sensation assists the user to select a desired operating system function or physically informs the user of the graphical objects encountered by the cursor within the GUI. A microprocessor local to the interface apparatus and separate from the host computer can be used to control forces on the physical object.

U.S. Pat. No. 6,743,019, issued Jun. 1, 2004 to Ransom, et al., discloses a method and apparatus for aircraft-based simulation of variable accelerations and reduced gravity conditions. A test chamber is pivotally suspended in an aircraft, so that the center of gravity of the test chamber always self-actingly orients itself in the direction of the effective residual acceleration. To simulate a selected acceleration greater than 0 g and less than 1 g, the aircraft is flown along a parabolic flight path with a downward vertical acceleration such that the difference between Earth's gravitational acceleration and the aircraft's acceleration corresponds to the selected acceleration to be simulated. To simulate gravitational conditions on Mars, the aircraft is flown with a downward vertical acceleration of about ⅔ g, so that the residual acceleration acting on the test chamber is about ⅓ g. The atmospheric conditions, such as the gas composition, pressure and temperature, of Mars can also be established in the test chamber.

U.S. Pat. No. 6,566,834, issued May 20, 2003 to Albus, et al. discloses a modular suspended manipulator to manipulate tools and loads using position, velocity and force control modes. The manipulator includes a plurality of cables (2 or more) that are independently controlled by modular, winch drive-mechanisms and coordinated to achieve intuitive manipulator movement in all six degrees-of-freedom. The manipulator consisting of modular sub-assemblies and components (i.e. winch, amplifier, servo interface, sensory feedback), can be reconfigured to adjust to new applications. Various combinations of manual and automatic control can also be implemented. The winches can be controlled manually by a multi-axis joystick, or can be automatically controlled by computer.

U.S. Pat. No. 5,379,657, issued Jan. 10, 1995 to Hasselman, et al., discloses a method and system for supporting a test article or structure in a gravity environment for the purpose of testing the article in a simulated weightless condition and includes at least one support assembly attached to the article for suspending the article from an overhead support. The support assembly includes three cables each having an end attached to the article. The cables are capable of being actuated to cooperatively maintain a constant resultant vertical force on the test article which is equal to the weight of the article. The system includes a controller which is capable of adjusting the force in each cable to continuously maintain the constant resultant force on the article as it moves from position to position. The controller can calculate the new position of the test article as it moves from position to position. The controller is able to calculate each new position, calculate the forces necessary to maintain the constant resultant force on the test article, and actuate the cables to develop the required cable forces to offset the weight of the test article as the test article moves from position to position. The system can also use a plurality of such support assemblies to handle large size test structures.

U.S. Pat. No. 4,860,600, issued Aug. 29, 1989 to Schumacher, discloses a machine system that enables close duplication of three of the six weightless degrees of freedom of a space environment in the gravity field on earth's surface. The three degrees of freedom are two translational degrees of freedom orthogonal to the gravity vector and one rotational degree of freedom parallel to the gravity vector. The mechanism concept that duplicates the weightless environment eliminates all but air bearing forces acting on the object being tested in the plane orthogonal to the gravity vector without adding significant mass to the test object or confining the test object translational or rotational movements in the plane orthogonal to the gravity vector. The machine consists of at least three test object support platforms which permit small test object movements relative to the support platform without applying forces to the test object. The test object movements relative to each support platform are sensed and used to control two support platform translational degrees of freedom to maintain the support platform position relative to the test object.

United States Patent Application No. 2011/0088586, published Apr. 21, 2011 to Huang, et al., discloses a system, method, and apparatus for providing a reduced or moderated gravity environment in a terrestrial payload. The system includes the evaluation of terrain to support an appropriately shaped vehicle guide, the construction of a vehicle guide, the provision of a high-speed vehicle and a control system adapted to control a motion of the vehicle across the vehicle guide with a specific velocity profile so as to produce a moderated gravity environment.

United States Patent Application No. 2010/0279255, published Nov. 4, 2010 to Williams II, discloses a vehicle simulation system may include: a platform positioned within a three-dimensional workspace, at least six upper support members positioned outside the three-dimensional workspace, at least six upper adjustable cables routed from corresponding upper support members and secured to the platform to apply at least a portion of upward tension to the platform, and a vehicle secured to the platform. The vehicle may provide one or more occupants with a simulated experience within a three-dimensional virtual environment as the upper adjustable cables are adjustably extended and retracted in a coordinated fashion to maneuver the platform.

Japanese Patent No. JP3213500, issued Sep. 9, 1991 to Kawasaki Heavy Ind. Ltd., discloses a gravity-free simulating device in which an active drive mechanism is located on a ground, and a test piece is mounted on the active drive mechanism through a sensor to detect a force and torque. The sensor is arranged so as to allow detection of the forces of the X-Z axes and torque around the X-Z axes. The active drive mechanism is formed so that an object can be actively driven in orientation to roll, pitch, and yaw around each of X-Z axes. Feedback control is made on the active drive mechanism so that a force and torque detected by the sensor are balanced with gravity of the test piece, and feed forward control is effected according to the speed detecting value of the test piece.

The above cited prior art does not solve the aforementioned problems. Accordingly, there exists a need for an improved active response gravity offload system. Consequently, those skilled in the art will appreciate the present invention.

SUMMARY OF THE INVENTION

One possible non-limiting object of the invention is to provide an improved three dimensional gravity field simulator.

Another possible non-limiting object of the invention is provide an improved angle sensor for a cable.

Another possible non-limiting object of the invention is to provide an improved vertical control system for a tracking system.

Another possible non-limiting object of the invention is to provide an improved horizontal control system that is operable for controlling swinging energy in a load connected to a cable.

These and other objects, features, and advantages of the present invention will become clear from the figures and description given hereinafter. It is understood that the objects listed above are not all inclusive and are only intended to aid in understanding the present invention, not to limit the bounds of the present invention in any way.

Accordingly, in one embodiment, a method is provided for making a three dimensional simulator that can be used to provide a selectable simulated gravity field. The method may comprise non-limiting steps such as providing a carriage with a cable extending from a spool of the cable wherein the cable is connectable to a load. Other steps may comprise providing a z-axis motor for the spool, providing an x-axis motor and a y-axis motor operable to move the carriage in an x-axis direction and a y-axis direction, respectively, and providing an angle sensor to determine an angle of the cable with respect to the vertical axis or z-axis ("the vertical"). Additional steps may comprise providing a load sensor to detect a load force for a load on the cable and to responsively produce a load sensor signal, providing a cable length sensor to measure a cable length extending from the spool, and providing a vertical control system with a selectable off load target for the selectable simulated gravity field. In one embodiment, the load sensor provides feedback for control of the z-axis motor to a digital non-linear filter that may comprise a first filter and a second filter having a higher cut off frequency than the first filter. Other steps may comprise providing a variable weighting factor for weighting an output of the digital non-linear filter between an output of the first filter and an output of the second filter by comparing the output of the first filter with the output of the second filter.

In one embodiment, the step of providing the variable weighting factor is based on determining an absolute or numerical difference between the output the first filter and the output of the second filter and also determining the difference between a rate of change between the output of the first filter and the output of the second filter. The method may comprise using a variable gain that conditionally becomes greater than one when the output of the digital non-linear filter lags data from the load sensor by a predetermined amount. In one embodiment, the variable gain of the digital non-linear filter is limited by an output of the second filter so that under certain circumstances the output of the digital non-linear filter is clamped to the output of the second filter.

In another embodiment, the method may further comprise providing a horizontal control system operable to utilize the angle sensor and the cable length sensor to control the x-axis motor and the y-axis motor to move the carriage for controlling an angle of the cable with respect to a vertical wherein the horizontal control system is operable for controlling both linear motion and non-linear swing energy.

The method may further comprise providing that the horizontal control is operable to compensate for swinging of the cable induced by movement of a human load or other moving load mounted to the cable. In one embodiment, the horizontal control utilizes a Lyapunov-based function to minimize the swing energy.

In another embodiment, a three-dimensional simulator is provided that is operable for providing a selectable simulated gravity field for a load. The simulator may comprise non-limiting elements such as a carriage with a spool mounted for horizontal motion, a length of the cable extending downwardly from the spool, the cable being connectable to the load, a z-axis motor operably connected to the spool for controlling the length of the cable extending from the spool, and an x-axis motor and a y-axis motor operable to move the carriage in an x-axis direction and a y-axis direction, respectively, to provide the horizontal motion. Other non-limiting elements may comprise an angle sensor operable to measure an angle of the cable with respect to the vertical, a load sensor to detect a load force responsive to the load on the cable and to responsively produce a load sensor signal, and a cable length sensor such as a motor position encoder to measure the length of the cable extending from the spool. A vertical control system controls the z-axis motor with a selectable off load target for the selectable simulated gravity field. A horizontal control system utilizes the angle sensor and the cable length sensor to control the x-axis motor and the y-axis motor to move the carriage for controlling an angle of the cable with respect to a vertical so that the horizontal control system is operable for controlling linear motion and minimizing swing energy.

In yet another embodiment, a cable angle sensor for a winch assembly may comprise a spool of cable and a spool lateral adjustment wherein the spool lateral adjustment is operable for moving the spool of cable to constrain the cable to within a region of error of an exit point of the cable from the winch assembly. In one non-limiting embodiment, the cable angle sensor may comprise a first laser sensor operable for detecting a first relative position of the cable and a second laser sensor spaced along the cable operable for detecting a second relative position of the cable. A processor is configured to determine an angle of the cable with respect to the winch assembly. The angle measurement is corrected with respect to an error of the spool lateral adjustment in maintaining the fixed exit point of the cable from the winch assembly. In one embodiment, the processor is operable for determining the angle with respect to a vertical reference line. In one embodiment, the processor is configured to determine and/or detect and/or cancel out error that occurs when lateral movement of the cable occurs that is common to both the first laser sensor and the second laser sensor.

In yet another embodiment, a method is provided for making a generalized tracking control system, wherein the tracking control system may comprise a sensor that provides a sensor signal. The method may comprise non-limiting steps such as providing that the sensor signal is operatively connected to a non-linear filter wherein the non-linear filter comprises a first filter and a second filter, and wherein the first filter and the second filter each may comprise a type of moving average filter, some possibilities of which are discussed herein. Other steps may comprise providing the first filter with a lower cut-off frequency as compared to the second filter, providing a weighting for the combined use of a first output of the first filter and a second output of the second filter to provide an output of the non-linear filter. Other steps may comprise providing that the weighting is based on a difference in the first output and the second output and can also be based on a difference in a rate of change of the first output and the second output.

In one embodiment, the method may further comprise providing that the first filter and the second filter each comprise a zero-lag exponential moving average filter. In one embodiment, when the difference in the first output and the second output is greater than a predetermined amount, then the non-linear filter can under some conditions have a gain greater than unity. However, in one embodiment, the non-linear filter output is limited to or is limited by the second output.

In yet another embodiment, a cable system with a load may comprise a carriage, a cable extending from the carriage connected to the load, a first motor for moving the carriage in a first horizontal direction, a second motor for moving the carriage in a second horizontal direction, an angle sensor operable for producing an angle sensor signal in response to an angle of the cable with respect to the vertical, and a horizontal control system operable for utilizing the angle sensor signal to operate the first motor and the second motor. The horizontal control system moves the carriage for controlling the angle. The horizontal control system may comprise a linear control and a non-linear Lyapunov control operable for controlling both linear displacement and swing energy of the load. In one possible embodiment, the carriage may comprise a hoist operable to vary a length of the cable.

BRIEF DESCRIPTION OF THE DRAWINGS

FIG. 11 shows embodiments of equations representing a first output of a first filter and a second output of a second filter.

FIG. 12 shows embodiments of equations representing an output of a non-linear filter, a weighting factor or weighting, an absolute difference, and a smooth rate of change difference.

FIG. 13 shows an embodiment of an equation representing a control variable.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
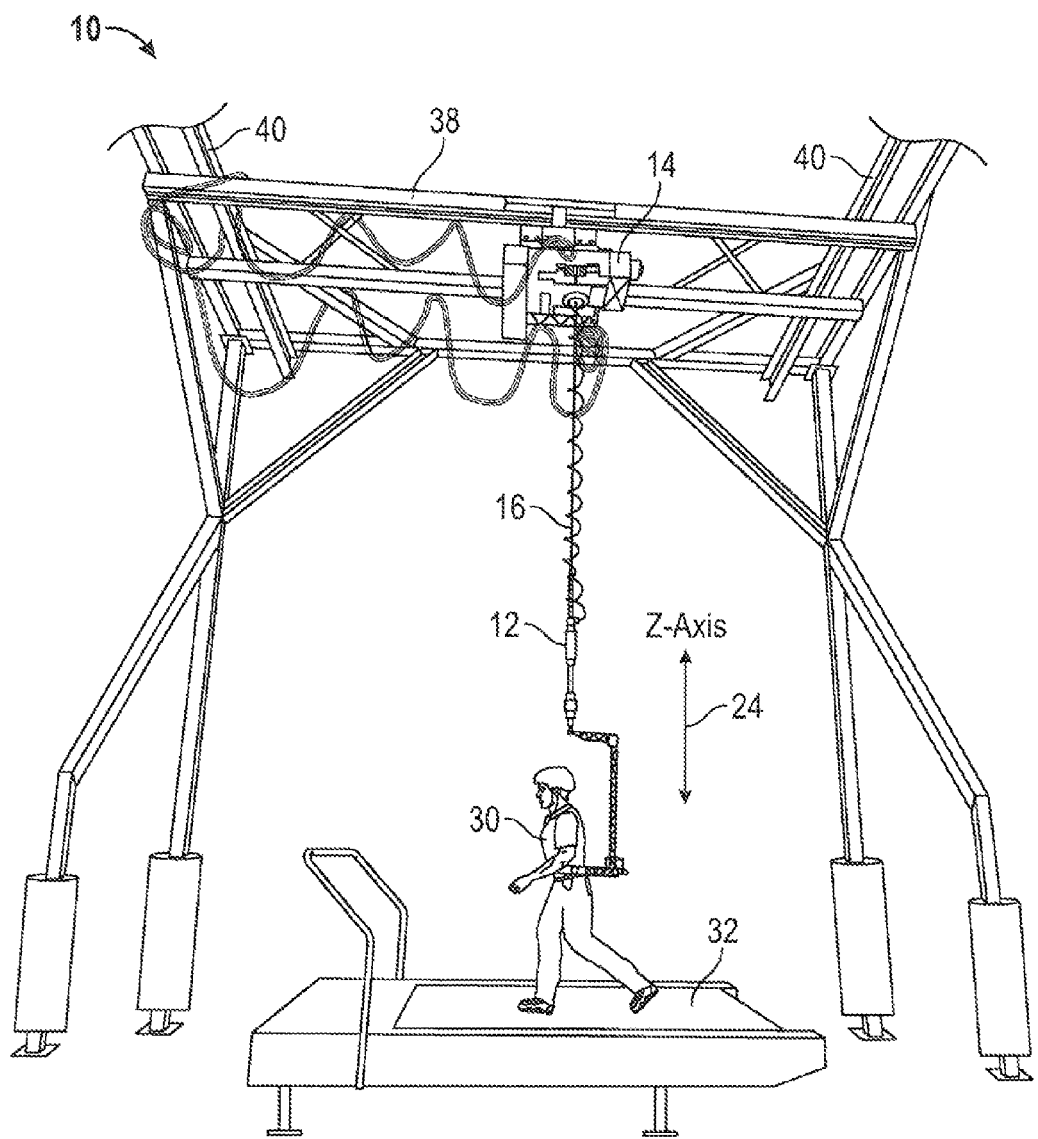
FIG. 1 is a perspective view of a variable gravity simulator with a human load using a treadmill while suspended from a vertical cable controlled by a z-axis vertical control system that is supported by a horizontally moveable carriage for three dimensional simulations in accord with one possible embodiment of the present invention.

Referring now to FIG. 1, there is shown a human user or human load 30 supported by active response gravity offload system (ARGOS) 10 while on a treadmill 32. The human user may produce force vectors that the system should appropriately react to such as jumping or the like. The ARGOS facility 10 is designed to simulate any reduced gravity environment, such as Lunar, Martian, or microgravity. The ARGOS facility 10 uses inline load sensor or cell 12 in substantially vertical cable 16 to continuously offload of a selectable portion of a human or robotic payload weight during all dynamic motions, which can include walking, running, and jumping under Lunar or Martian gravities, as well as a wide range of microgravity activities. The system is able to compensate for the various types of forces that are produced by a moving load.

Figure 2:
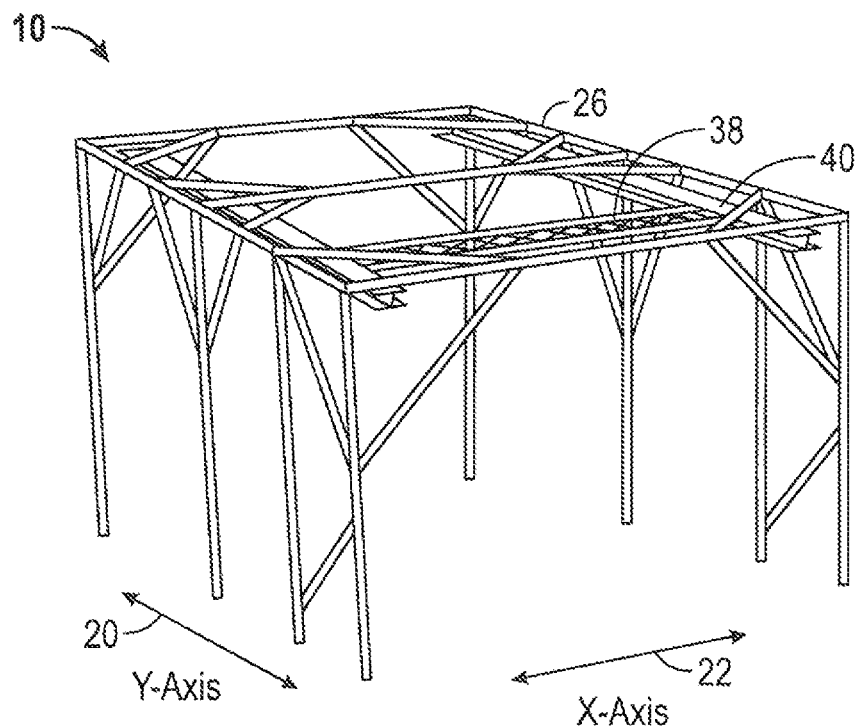
FIG. 2 is a perspective view of a framework used to provide structural support for the reduced gravity system of FIG. 1 with the x-axis direction and y-axis direction for the moveable carriage indicated for the horizontal control system in accord with one possible embodiment of the present invention.
Figure 3:
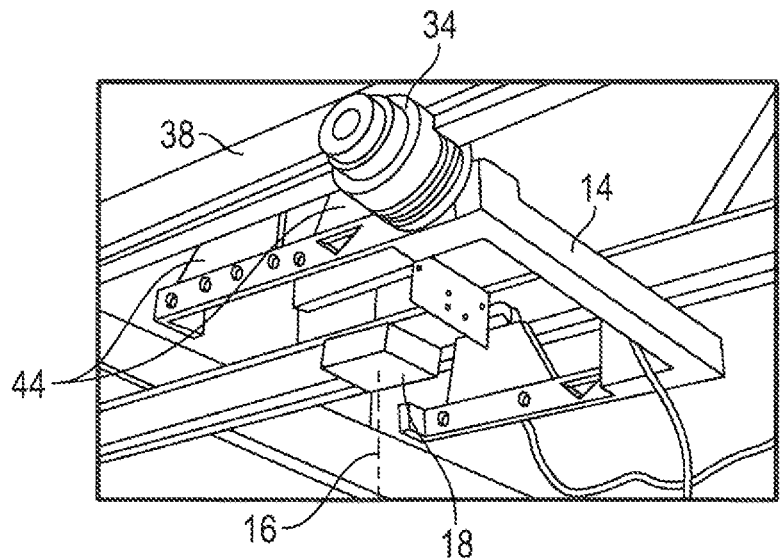
FIG. 3 is a perspective view of a carriage mounted on a cross-beam for movement in an x-axis direction and the cross-beam moveable in a y-axis direction wherein the carriages supports a spool for a substantially vertical cable for z-axis movement of the load in the reduced gravity simulator of FIG. 1 in accord with one possible embodiment of the present invention.

Using laser cable angle sensor 18, as better shown in FIG. 3, ARGOS actively tracks and follows the payload's motion in vertical direction, z-axis 24, and horizontal directions, x-axis 22 and y-axis 20, as referenced in FIG. 2, to maintain a vertical offload force. Horizontal motion is defined as motion in the x-axis 22, y-axis 20, or both. Argos facility 10 is capable of supporting surface operation studies, space suit and vehicle requirements development, space suit and vehicle design evaluation, robotic development, mass handling studies, and crew training with both suited (e.g. space suits) and shirt-sleeved subjects. The current steel frame structure 26 shown in FIG. 2 measures forty-one feet in the y-axis direction, twenty-four feet in the x-axis direction and is twenty-five feet tall. Accordingly, ARGOS facility 10 accommodates movement in all three directions of motion.

The ARGOS facility 10 is rapidly reconfigurable to allow for a quick turnaround between different tests and a variety of surface or training analogs. The ARGOS facility 10 uses computer controlled electric motors to drive motion in all axes. Steel cable 16 connects to the load, such as human 30 or other objects. ARGOS facility 10 measures the vertical load with in-line load cell 12 that is constantly monitored by the vertical control system, which is described hereinafter. The vertical control system commands the vertical control motor mounted in carriage 14 to raise or lower as the subject moves to maintain a constant offload force, related to the particular gravity field simulation. In one embodiment, the vertical axis control motor operates a winch for the cable and is capable of high accelerations with a top speed of 10 feet/second for a 300 pound payload and 4 feet/second for a 750 pound payload.

Figure 4:
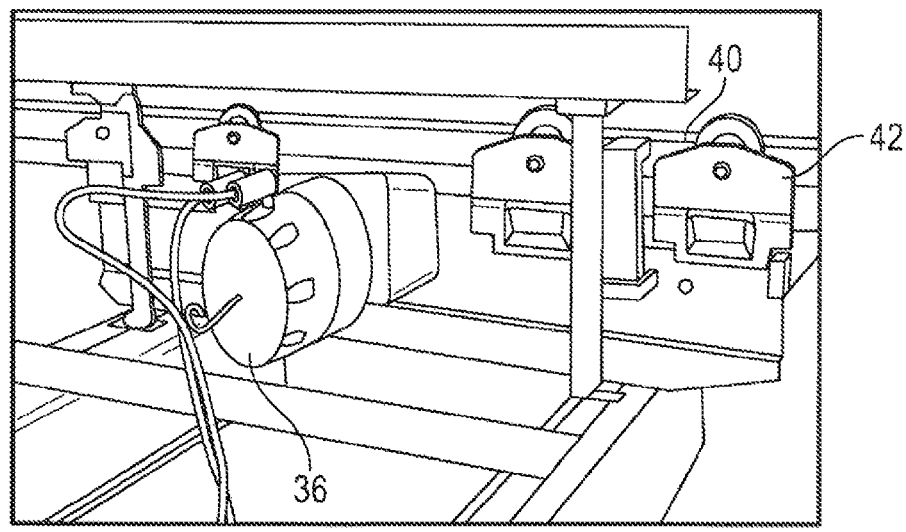
FIG. 4 is a perspective view showing one side of a mounting of the cross-beam to the reduced gravity simulator system frame with one of the drive systems for moving the cross-beam in the y-axis direction in accord with one possible embodiment of the present invention.

The horizontal axes are also driven by electric motors, incorporated into x-axis motor or drive system 34 (FIG. 3) and y-axis motor or drive system 36 (FIG. 4), that are attached to friction drive wheels which drive on the underside of cross-beam 38 and y-axis trolley rails 40. Cross beam 38 is supported by passive trolleys such as passive trolley 42 (FIG. 4).

Carriage 14 is also supported by passive and/or active trolleys 44 (FIG. 3). It will be noted that the y-axis drive system 36 may preferably comprise two motors on opposite sides of cross-beam 38 for moving cross-beam 38 back and forth in the y-axis direction 20 as indicated in FIG. 2.

Figure 5:
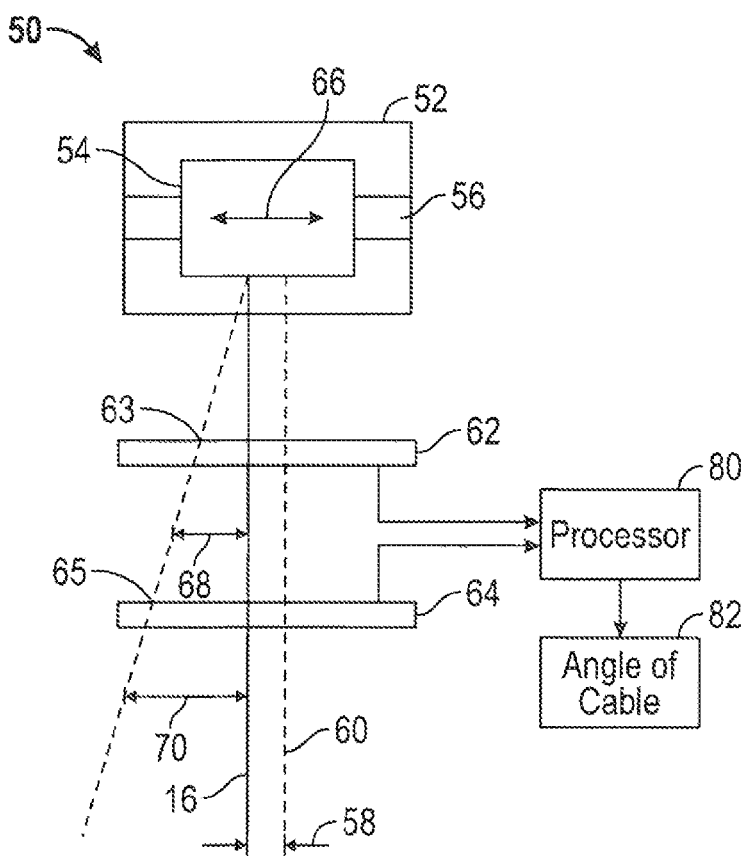
FIG. 5 is a schematic view of a multiple laser angle sensor in accord with one possible embodiment of the present invention.

Motion of the supported subject 30 is measured by a cable angle sensor, such as laser sensor 18 of FIG. 3, which is used to command the system to control the angle of the cable, e.g. angle 68 of FIG. 5, with respect to the vertical 24 and generally keeps carriage 14 centered or substantially centered above the load depending on the simulation, with the angle typically being less than about three degrees. The horizontal control system (see 400 FIG. 9 or 508 FIG. 10) is capable of high accelerations (e.g., at least 10 feet per second per second) and a speed up to about 10 feet/second for any payload weight. In addition, ARGOS is designed to accurately reproduce a reduced gravity environment. This means that a three dimensional force vector in any direction results in constant velocity motion until another force acts on the payload, which results in high fidelity testing and training. Laser angle sensor 18 may provide motion sensitivity to cable movement in the micrometers.

FIG. 5 shows one possible non-limiting more detailed example of laser angle sensor 50 in accord with another embodiment of the present invention that may be utilized for laser angle sensor 18 or for another type of angle sensor. Only one dimension of angle sensor 50 is shown in FIG. 5 and it will be understood that the angle sensor used with ARGOS facility 10 detects motion in two dimensions in a similar manner as the one dimensional example discussed below. Moreover, it will be understood that this type of sensor may or may not be utilized in the system. For example, instead of angle sensor 50, a laser sensor with a single set of laser sensors could be used that is positioned about eight inches below carriage 14. However, in this embodiment, laser angle sensor 50 utilizes a first and second laser sensor 62 and 64, respectively, positioned at different vertical positions to provide one or more inputs to processor 80 which is programmed with an algorithm used to determine the angle 82 of cable 16 with respect to the vertical 60 or z-axis 24. It will be noted that processor 80 may be part of the vertical control system or horizontal control system and/or may be the same processor or within a group of processors utilized for the horizontal and/or vertical control systems. The processor output calculated angle 82 of the cable 16 is used by the vertical and horizontal control systems as discussed hereinafter. Spool assembly 52 (FIG. 5) may comprise z-axis motor 102 (FIG. 6) and spool 54 of cable 16. Spool 54 is moveable as indicated by arrow 66 to provide that cable 16 comes off at a substantially fixed position with respect to spool assembly 52. Accordingly, as cable 16 winds on and off, spool 54 is mounted on lateral adjustment system 56 that may comprise threaded members or the like to move to counteract the change of position at which the cable comes off of spool 54. However, a range of small lateral movement errors or cable shifts may occur as indicated by arrow 58 where the spool rotational movement is not perfectly compensated for and cable 16 moves laterally from another position as indicated by vertical line 60, creating a possible error in reading whether the cable is angled or has moved laterally due to error in the compensation system of spool assembly 52.

A laser detector can detect a change in lateral positions 63, 65 of cable 16 with respect to a designated reference such as vertical reference 60. However, with only one laser, whether the cable angle has changed and/or whether a lateral error 58 has occurred in the positioning of spool 54 may not be distinguishable. By utilizing two lasers at different vertical heights, the amount of shift 58 is also detected and distinguished from a change in angle as indicated at 68 and 70. For example, if cable shifts by an amount 58 and both laser detectors read the same amount of shift 58, then it will be apparent that cable 16 is still vertical and an error has occurred in the movement of spool 66 without an actual change in the angle of cable 16. If laser detectors or sensors 62 and 64 read different amounts then an angle 82 can be detected by processor 80 because processor 80 is programmed with an algorithm that compensates for a lateral shifting error of the spool, if one occurs. The lateral shifting error can be subtracted due to any common shifting error signal generated by both laser sensors 62 and 64.

Figure 6:
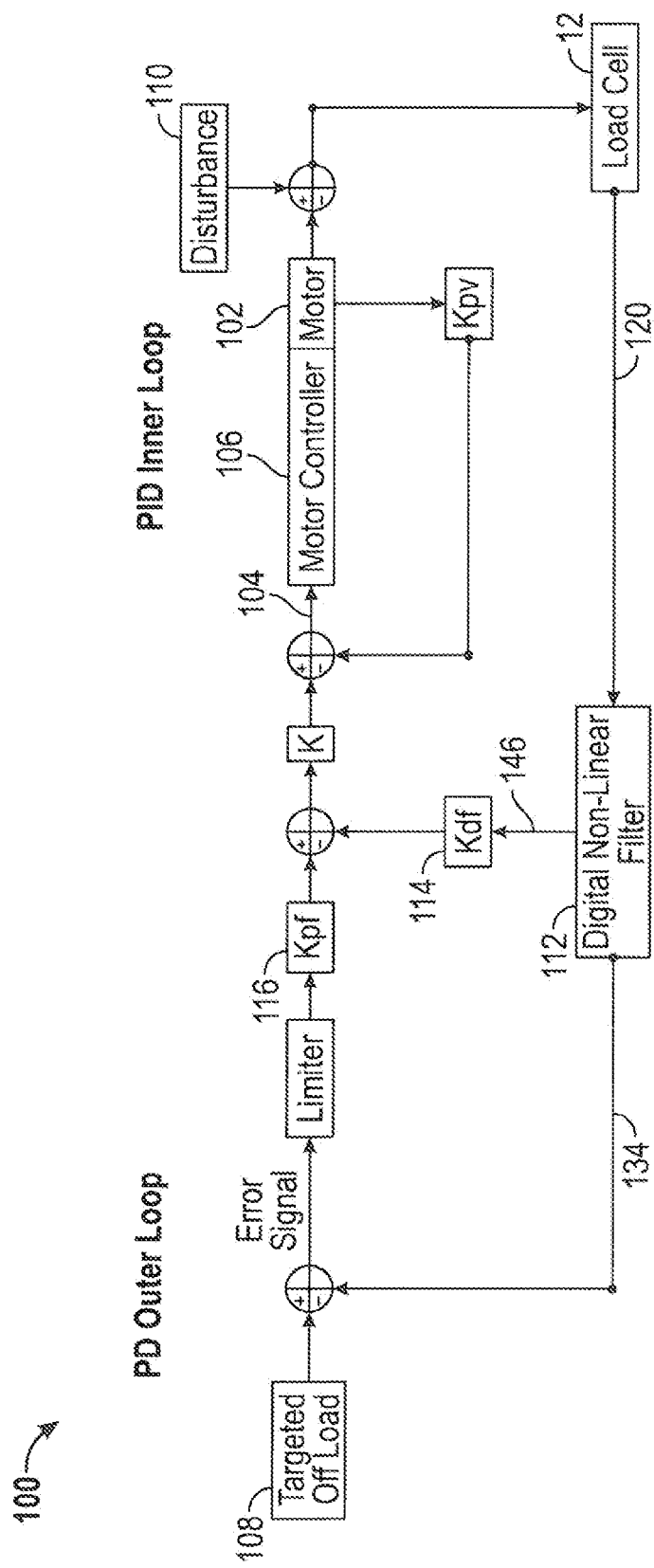
FIG. 6 is a basic block diagram schematic for a vertical control system or vertical hoist control system in accord with one possible embodiment of the present invention.

FIG. 6 shows a basic block diagram of vertical control or vertical hoist control system 100, which is a type of tracking system that causes motor action in an attempt to reduce an error signal such as error signal 134. The proportional derivative (PD) or proportional derivative velocity (PDV) outer loop takes sensor inputs from inline vertical load cell 12 (see FIG. 1) and encoders for motor 102 and outputs a final velocity command at 104 based primarily on the force error present in the system with an additional bias on the current velocity of the system 100 due to the momentum of the load in a particular gravity field simulation. The velocity command is applied to motor controller 106 that is tuned for this system. Motor controller 106 takes the velocity command from the software and uses the command as the input to velocity proportional integral derivative (PID) inner loop. This PID loop uses feedback from motor 102 to try to match the velocity command (by providing torque based on that feedback loop) that results in a continuous motion related the amount of gravity that the system is simulating. In a reduced gravity simulation, the vertical motion continues so long as no other force acts on the load and so long as the load remains within a safe range of movement. In control interface 200 of FIG. 7, kpv or kv value 202 may be set to about 1 (e.g., to 0.95) to provide for a microgravity environment and correspondingly less for a Martian or Lunar environment. This PID loop may be loosely tuned so the loop acts like a low pass filter and gives smooth motion. However, the system is still very responsive and capable of accelerations of up to about 60 feet per second per second for fast motions such as a jump in Lunar gravity as indicated by disturbance 110 that would be detected by load cell 12.

Figure 7:
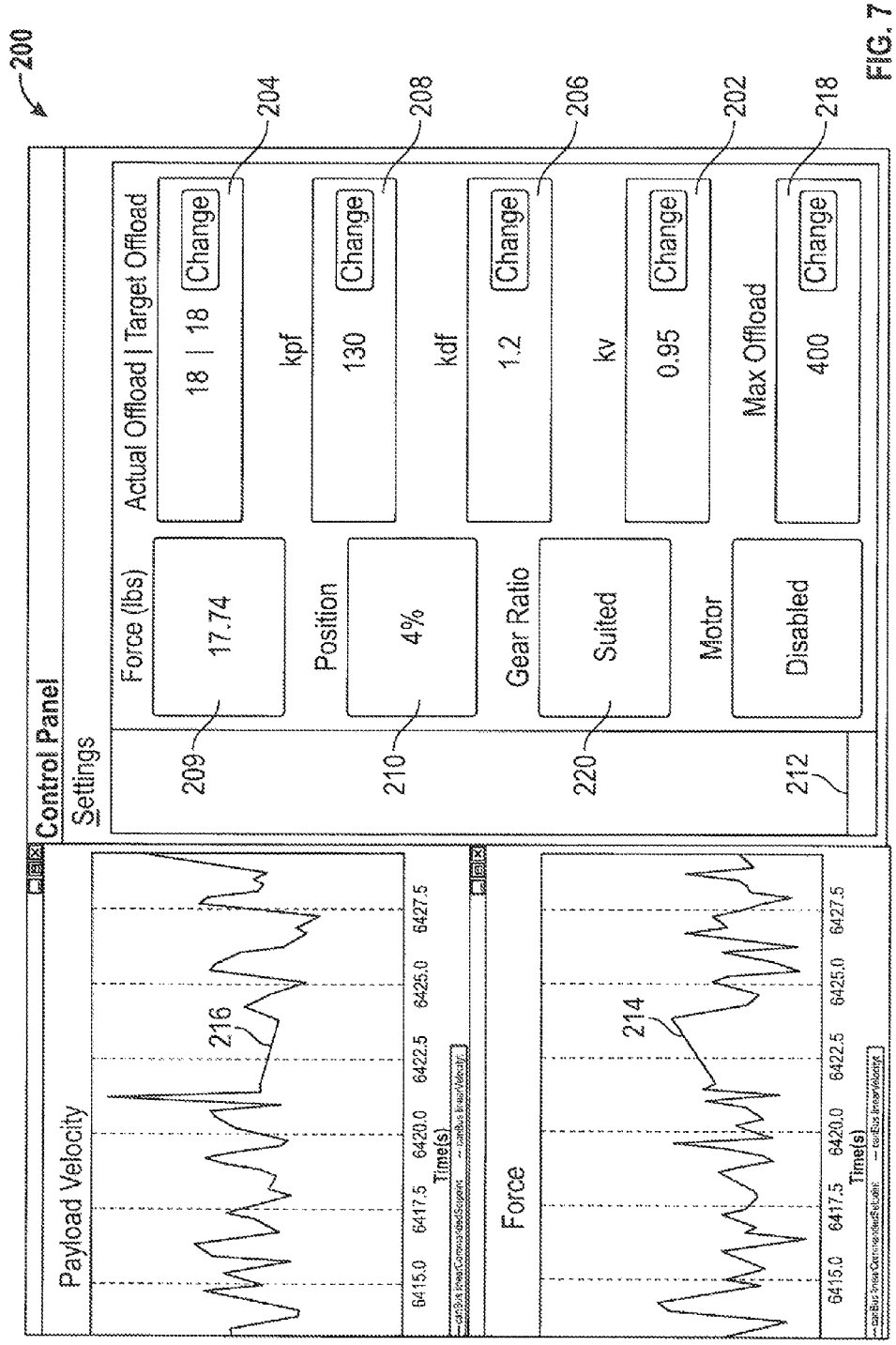
FIG. 7 shows one possible vertical control interface computer screen that may be utilized for controlling the vertical hoist control system in accord with one possible embodiment of the invention.

Targeted offload 108 or the target signal in control system 100 of FIG. 6 is the amount of weight the system is offloading and may be represented in control interface 200 as a force at 204 in FIG. 7. For example, if a person or object for the simulation weighs 160 pounds and a microgravity environment is desired, then force 204 in FIG. 7 may be set for 160 pounds.

Digital non-linear filter 112 is utilized in a feedback loop to filter noise. However, digital non-linear filter 112 is also designed to react to a real disturbance 110 as discussed in more detail hereinafter. The outputs of digital non-linear filter 112 may comprise a derivative velocity command 146 operated on by coefficient 114 (FIG. 6), and an error signal output 134 that is acted on by coefficient 116, wherein the coefficients correspond to the type of gravity environment to be simulated, as discussed hereinafter. These coefficients can be input into the control system in interface 200 at 202, 206 and 208 respectively.

The screen of control interface 200 can be altered as desired. In this embodiment, element 210 and graph 212 show cable length data such as the percentage length of the travel of cable 16 that can be utilized. This information is also provided to the horizontal control system. The display of cable length data at 210 and 212 is easily visualized by an operator using control interface 200 for safety monitoring purposes during operation of the system. The velocity and force data for the payload, such as user 30 or other objects, can be displayed versus time as indicated at 214 and 216. The velocity data and cable position data may come from an encoder built into motor 102, which may or may not be an off the shelf item. The force data may be obtained from load cell or load sensor 12. In this embodiment, the "suited" indication at 220 is for a heavier payload, such as a spacesuit or robot, which requires a gear ratio suitable for lifting heavier loads. In one embodiment, the term "suited" may be used to denote a relatively heavyweight load, e.g., up to 700 pounds, with low dynamics (8.64:1 gear ratio). The term "unsuited" may be used to denote a relatively lightweight load, e.g. up to 350 pounds, with high dynamics (3.6:1 gear ratio). The suited/unsuited term can be in the interface used to reflect whether an astronaut is suited with a space suit as required for space walks or is unsuited with clothes for use inside a spacecraft. Changing between "suited" and "unsuited" on the control panel can be used to change the operation of system 10 and affect the maximum offload of the system as indicated at 218. The gear ratio may be changed manually or automatically.

As is the case with typical filters in a control system, the general purpose of filter 112 is to filter out oscillations and/or other noise in the ARGOS load cell data 120 that the system should not respond to. At the same time, the filter attempts to preserve the pertinent force data from load cell or sensor 12 for the control system with minimal lag. This is especially difficult in the case of the ARGOS Z-Axis control system 100, because the frequencies of system noise and pertinent data overlap. In addition, the ARGOS system cannot tolerate a large amount of lag (e.g., at least 2 milliseconds of lag in the load cell data), which can cause the control system to become unstable.

For the above reasons, a standard low-pass filter is ill-suited for control system 100. With a low pass filter alone, relevant data is lost because the filter cannot preserve the relevant system data from load cell 12 that lies in the same frequency range as the noise. In addition, low-pass filters at the required frequencies introduce unacceptable lag into the control system. For example, introduction of a digital two pole Butterworth filter into the control system with a cutoff frequency of 100 Hz reduced the achievable system gains by over 75% versus unfiltered data.

The ideal feedback filter 112 would provide (1) low-pass filtering of high frequency (generally greater than about 60 Hz) load cell noise perfectly with zero lag in real-time, (2) low-pass filtering of all system noise (all frequencies, down to about 1 Hz) perfectly with zero lag in real-time, and (3) preserve relevant system data (e.g., 0-200 Hz) perfectly with zero lag in real-time. 200 Hz is used as an upper threshold because human motions can generate sudden force changes approaching this frequency.

Clearly, this sort of filter is unobtainable. No filter can act with zero lag, so the best that can be done is to minimize the amount of lag present. The second and third ideal requirements directly conflict with one another.

Figure 6A:
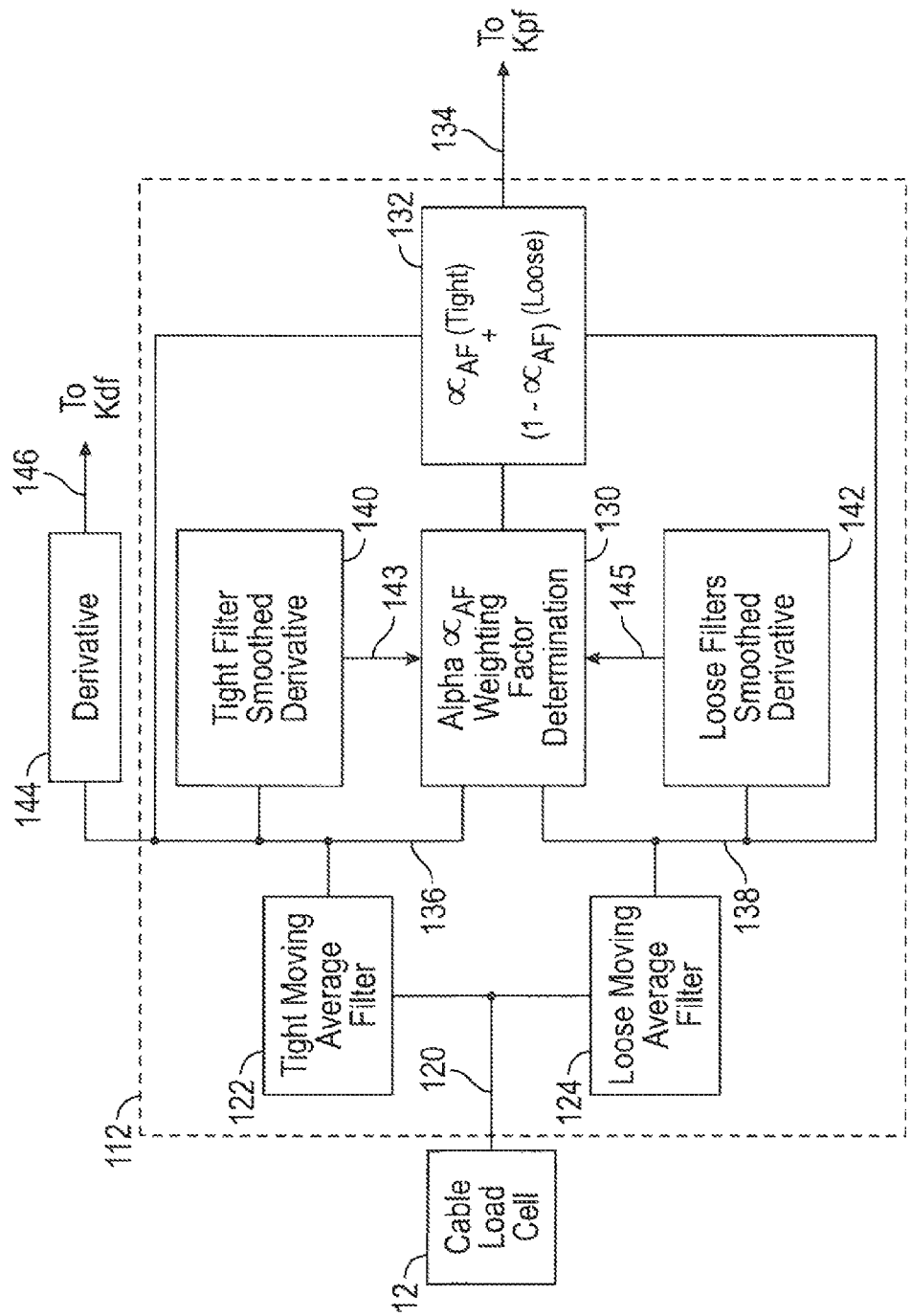
FIG. 6A is a block diagram schematic for a non-linear filter that may be utilized in the vertical control system or vertical hoist control system of FIG. 6 in accord with one possible embodiment of the present invention.

Filter 112 shown in more detail in FIG. 6A addresses these issues. In one embodiment, filter 112 adaptively combines two different software derived filters: one low-pass filter 124 with a very low cut-off frequency (e.g., from about 0 to about 10 Hz), which can be referred to as a loose filter and one low-pass filter 122 with a relatively high cut-off frequency (e.g., at least about 250 Hz), which can be referred to as a tight filter. Loose filter 124 eliminates virtually all system noise present while introducing a large amount of lag. Tight filter 122 reduces very high frequency load cell noise (e.g., frequencies above the high cut off frequency of the tight filter) while preserving the relevant system data with little lag. However, tight filter 122 also allows an acceptable amount of the system noise such as physical vibrations and the like that the system should not respond to. So the outputs of the two filters 122 and 124, which may also be referred to herein as first and second filters, are combined with variable favor shown towards the one that makes the most sense to use in a certain instance. While two filters are utilized in this embodiment, additional filters could conceivably be used for comparison purposes whereby the outputs are combined/compared in accord with the present teachings for comparison/combination of the relevant filter outputs as discussed hereinafter.

To combine two filters, knowledge of the recent and current system behavior can be utilized to estimate to what extent each filter should be favored. There are four main cases that might be seen by ARGOS vertical control system 100:

(1) Load is not moving or is essentially still in the vertical direction. There is very little system noise while the motor is not spinning. However, there is load cell noise present at all times, and slight movements may cause vibrations and noise down the lifting cable 16.

(2) Load is moving slowly (e.g., up to about 2 ft/s) in the vertical direction. Both load cell noise and system noise/vibrations are present, but the force offload error is generally small (e.g., between about 1 to about 2 lbs).

(3) Load is accelerating rapidly (e.g., at least 5 feet per second per second), and the force changes very quickly (10-20 pound per foot changes in a few milliseconds are possible). Both load cell noise and system noise/vibrations are present, and the force error can be large (e.g., between about 10 to about 40 lbs).

(4) There is an impulse introduced into the system, such as a very hard foot strike from a test participant or a test participant using a hammer on a rock. Depending on the situation, these impulses can reach force errors of 75 pounds or more and only last for a few milliseconds.

Both the loose and tight filters will behave certain ways in each of the four cases above:

In the first case, the loose filter 124 and tight filter 122 will generally be fairly close in absolute difference, e.g., subtracting a first filter output 138 from the second filter output 136, because the electronic noise of the load cell is generally less than a pound. In addition, the smoothed rate of change 143, 145 over a certain number of samples will be similar between the two filters, so the absolute difference of that rate of change will be small (e.g., near 0). If only white noise is present and the force stays constant, taking a smoothed rate of change over a sufficient number of samples should ideally result in a zero rate of change for both filters.

In the second case, the loose filter 124 and tight filter 122 will be greater in absolute difference than the stationary case, since system vibrations are present. However, the smoothed rate of change difference 143 and 145 between the two filters should still be fairly small (e.g., near 0), since slow movements essentially mask the lag of the loose filter.

In the third case, the loose and tight filters will quickly diverge in values, and the absolute difference between them, i.e., outputs 136 and 138 will grow quickly. This is due to the loose filter lagging behind the tight filter. In addition, the difference between their smoothed rates of change 143, 145 will also grow quickly.

In the fourth case, for a very short period of time (e.g., a few milliseconds), both the value and rate of change of the loose and tight filters will be large. The values may be diverging by nearly the full magnitude of the force impulse and rate of change difference can be in the thousands of pounds per second instantaneously. However, since the rate of change is smoothed over a period of time as indicated at 140 and 142, the fact that this impulse only lasts on the order of milliseconds means that it will be filtered out at least partially.

By focusing on these four cases and weighting between the two filters 122 and 124, non-linear filter 112 can attempt to differentiate between meaningless noise and meaningful force changes, often in the same frequency range. The weighting of the filter for the four cases is as follows:

In the first case, to minimize chatter around the zero point, loose filter 124 should be strongly favored. Since nothing is really happening in this case, the system should not be reacting to every slight force change (until, of course, a participant unexpectedly jumps or moves).

In the second case, during slow motions, the low reactivity of loose filter 124 is desired, but the control system incorporates a low-lag filter to properly keep up with the load and prevent instabilities. In this case, both filters 122 and 124 should be incorporated into the final non-linear filter 112 output indicated at 134.

In the third case, in order to keep up with a very fast acceleration (e.g., at least 5 feet per second per second), tight filter 122 is favored almost exclusively.

In the fourth case, loose filter 124 should be favored because the control system ideally should not react to one of these impulses Reacting to impulses would result in an underdamped ring in the system.

It is very difficult to differentiate in real time between a real sudden force change and system vibrations, so care is taken to not weight according to the third case too liberally. Weighting system 130 produces a weighting factor, sometimes referred to herein as an alpha factor. If weighting system 130 or the corresponding weight factor is too reactive, then non-linear filter 112 will be no different than just running a tight filter during even the slowest motion. However, if the weighting system 130 is too sluggish, the system will lag behind during actual motions and will lose stability very quickly.

To solve this issue, filter 112 is designed to initially be sluggish to react. However, filter 112 is also designed to go unstable very quickly and gain greatly if the two filters 122 and 124 continue to diverge. Referring to FIG. 6A, a weighting factor, which may be referred to as alpha or $\alpha_{AF}$, which is discussed in greater detail hereinafter, is calculated at 130. As such, if the loose and tight filters diverge enough, then filter 112 is designed to have an output with a gain as indicated at 132 greater than unity (see equation for $f_{ATF}$ discussed hereinafter), and will very quickly make up the difference between the loose filter 124 and the tight filter 122. In one embodiment, to ensure safety and stability, filter 112 gain as indicated at 132 is limited so that output 134 is not allowed to exceed the tight filter output 136 and latches to the tight filter output 136 when the gain would otherwise cause filter 112 output 134 to become greater than the tight filter output 136. By allowing this behavior, the effective lag of filter 112 can be significantly reduced, while still maintaining enough lag to prevent responding to every vibration in the system.

In one embodiment, filter 112 works by first computing two nonlinear zero-lag exponential moving average (ZEMA) low-pass filters 122 and 124. As noted above, a first of these filters has a very low cut-off frequency (loose filter 124, e.g., between about 0 to about 10 Hz) and a second of these filters has a relatively high cut-off frequency (tight 122 filter, e.g., at least about 250 Hz). The loose filter 124 only tracks the general low frequency trend of the data, but has a relatively large amount of lag (e.g., greater than a few milliseconds). The tight filter 122 removes only a small amount of the very high frequency electronic noise and has very little lag (e.g., between about 1 and 2 milliseconds). The processor that creates the non-linear filter 112 then compares the loose and tight filter outputs to determine a weighting factor $\alpha_{AF}$ between the two filters as indicated at 130. By comparing the absolute difference between the outputs 136 and 138 of two filters and the difference in their rates of change as indicated at 140, 143 and 142, 145 (in essence, the difference of their derivatives or smoothed derivatives 143, 145), the weighting factor, or alpha, can be determined. Then, using the weighting factor determined at 130 and the loose and tight filter outputs, non-linear filter 112 output or gain can be calculated as indicated at 132. This process effectively leads to producing output 134, which results in an error signal after comparison with targeted offload 108 that is utilized with coefficient Kpf 116 of FIG. 6. As noted herein, the coefficients 202, 206, and 208 are inputs that vary depending on the magnitude of the gravity field that is being simulated (See FIG. 7). Non-linear filter 112 may also generate signal 146 for use coefficient Kdf 114 in FIG. 6 using derivative function 144.

In summary of this feature of the invention, to help reduce lag, the non-linear filter 112 is designed to go unstable with a gain greater than unity if output 132 falls behind the data too far based on the equations discussed in more detail hereinafter. However, so that non-linear filter 112 keeps vertical control or tracking system 100 safe and stable, filter gain 132 is not allowed gain that results in an absolute output 134 greater than tight filter output 136. In the event that it would, then the processor that creates non-linear filter 112 is programmed to automatically select the tight filter output 136 for that iteration In more detail of one possible embodiment, the loose and tight filters 122 and 124 used to form filter 112 can be Zero-Lag Exponential Moving Average (ZEMA) filters, and use a rate of change weighting in an attempt to reduce lag from a standard Exponential Moving Average (EMA) filter (Ehlers).

$$f_{loose}[k]=\alpha_{loose}(f_{act}[k]-\gamma_{loose}\delta[k])+(1-\alpha_{loose})f_{loose}[k-1]$$

$$f_{tight}[k]=\alpha_{tight}(f_{act}[k]-\gamma_{tight}\delta[k])+(1-\alpha_{tight})f_{tight}[k-1]$$

$f_{loose}$ — Loose Filtered Force
$f_{tight}$ — Tight Filtered Force
$f_{act}$ — Actual Force from Load Cell
$\alpha$ — EMA filter coefficient
$\gamma$ — Rate of change gain factor
$\delta$ — Rate of change
k — discrete time step In one embodiment, the EMA filter coefficients for the loose and tight filters were chosen experimentally to be:
$\alpha_{loose}=0.1$
$\gamma_{loose}=0.1$
$\alpha_{tight}=0.5$
$\gamma_{tight}=0.5$ The force rate of change ("force velocity") gain factor, $\gamma$, works on the rate of change of the force, $\delta$, to minimize the error term of the EMA filter and was chosen after experimenting with various values for each filter. This force velocity combines the recent smoothed rate of change of both the loose filter and the tight filter:

$$\delta_{loose}[k]=a_1(f_{loose}[k-1]-f_{loose}[k-4])+a_2(f_{loose}[k-1]-f_{loose}[k-10])+a_3(f_{loose}[k-1]-f_{loose}[k-15])+a_4(f_{loose}[k-1]-f_{loose}[k-19])$$

Where $a_1+a_2+a_3+a_4=1$ and were determined by computer simulations and physical testing.

$$\delta_{tight}[k]=b_1(f_{act}[k-1]-f_{act}[k-4])+b_2(f_{act}[k-1]-f_{act}[k-10])$$

Where $b_1+b_2=1$ and were determined by computer simulations and physical testing.

Finally, the combined force velocity of the loose and tight filter:

$$\delta[k]=c_1\delta_{loose}[k]+c_2\delta_{tight}[k]$$

Where $c_1+c_2=1$ and were determined by computer simulations and physical testing. The actual coefficients used in one possible embodiment of filter 112 are:

| $a_1$ | $a_2$ | $a_3$ | $a_4$ | $b_1$ | $b_2$ | $c_1$ | $c_2$ |
|---|---|---|---|---|---|---|---|
| 0.8 | 0.1 | 0.05 | 0.05 | 0.9 | 0.1 | 0.9 | 0.1 |

With the loose and tight filters now computed, their absolute difference or difference between 136, 138, $d_{filter}$, and smoothed rate of change difference as indicated by 140, 143 and 142, 145 in FIG. 6A, $v_{filter}$, can be calculated:

$$d_{filter}[k]=|f_{loose}[k]-f_{tight}[k]| \, v_{filter}[k]=b_3(|(|f_{loose}[k]-f_{loose}[k-12]|)-(|f_{tight}[k]-f_{tight}[k-12]|)|)+(1-b_3)(v_{filter}[k-1])$$

Where $b_3<1$ and was determined by computer simulations and physical testing. The value used in filter 112 is $b_3=0.6$.

At this point, the final filter output 134 and gain as indicated at 132 can be computed:

$$f_{ATP}=(1-\alpha_{AF})f_{loose}[k]+\alpha_{AF}f_{tight}[k]$$

Where:

$$\alpha_{AF}[k]=(y)\frac{d_{filter}[k]+\frac{v_{filter}[k]}{\beta_1+d_{filter}[k]}}{1+\frac{1}{\frac{v_{filter}[k]}{\beta_1+d_{filter}[k]}+\beta_2 d_{filter}[k]}}+(1-y)\alpha_{AF}[k-1],$$

where y $(0<y\leq 1)$, and where $\beta_1$ ($\beta_1>1$) and $\beta_2$ ($0<\beta_2<1$) are coefficients that were determined experimentally. The actual values chose are $\beta_1=5$ and $\beta_2=0.2$ The goal of the numerator is to grow $\alpha_{AF}$ as $d_{filter}$ or $V_{filter}$ increase (with preference given to $d_{filter}$). So, as either of these values increases, the numerator increases as well.

Similarly, the denominator shrinks to unity as either $d_{filter}$ or $v_{filter}$ increases, which in turn increases the value of $\alpha_{AF}$.

Non-linear filter 112, however, is designed to go unstable in the presence of a large force deviation. The alpha variable can very quickly grow to be greater than one, at which point the filtered force can overshoot the value of the true force. For this reason, the computed filter value output 134 is checked against the tight filter output 136 (and the tight filter output 136 is checked against the loose filter output 138) to determine the proper ordering of the three to ensure stability. If the computed non-linear filter absolute output 134 is greater than the tight filter absolute output 136 and the tight filter output 136 is greater than the loose filter output 138, the computed filtered value is locked to the tight filter output 136. An identical result occurs if the computed non-linear filter output 134 is less than the tight filter output 136 and the tight filter output 136 is less than the loose filter output 138.

Referring again to FIG. 1-FIG. 4, the present invention can also incorporate a horizontal control system. The horizontal control system is indicated at 400 in FIG. 9 (computer interface of the horizontal control system) and 508 in FIG. 10 (block diagram indication with horizontal control system). As discussed above, the vertical and horizontal drive systems provide linear motion and offload capability and comprise a type of tracking system whereby carriage 14 is controlled to track movement of the load utilizing error signals that are minimized by operating the x and y motors. The horizontal and/or vertical control systems may be referred to herein as tracking systems that attempt to reduce an error signal, cable systems that control cables used in a tracking system, or the like as is consistent with the present disclosure. The vertical system, which is a tracking system in itself, can be referred to as the z-axis system. The z-axis system utilizes a servo motor controlled winch, such as winch or hoist assembly 52 in FIG. 5, with encoder feedback from an encoder that may typically be part of motor 102 in FIG. 6, with these components being supported by carriage 14. The horizontal drive system, which is also a type of tracking system that attempts to reduce an error signal as discussed below, moves carriage 14 with two degrees of freedom in the horizontal plane. The horizontal or horizontal plane is referred to herein as x-axis 22 and y-axis 20 as shown in FIG. 2, but could utilize any coordinate system. Moreover, while the three dimensional coordinate system used herein comprises axes that are aligned with the direction of movement of carriage 14, this is not required and is used as a convenience for calculations. The x-axis portion of the system utilizes a single servo motor system 34 with linear and rotary encoder feedback with carriage 14 being moveable back and forth in the x-axis direction on cross-beam 38. The y-axis portion of the system utilizes two electronically geared servo motors 36 that move cross-beam 38 back and forth in the y-axis direction with linear and rotary encoder feedback. As discussed previously, the first generation ARGOS system was not able to control swing energy. The present invention has dynamic capabilities that can effectively reduce cable angle and swing energy generation in ARGOS system 10.

The horizontal system controller utilizes a combination PD control 530 (See FIG. 10) and Lyapunov-based nonlinear controller 532, which provides a way of regulating the swinging energy from the horizontal drive system 508.

Figure 8:
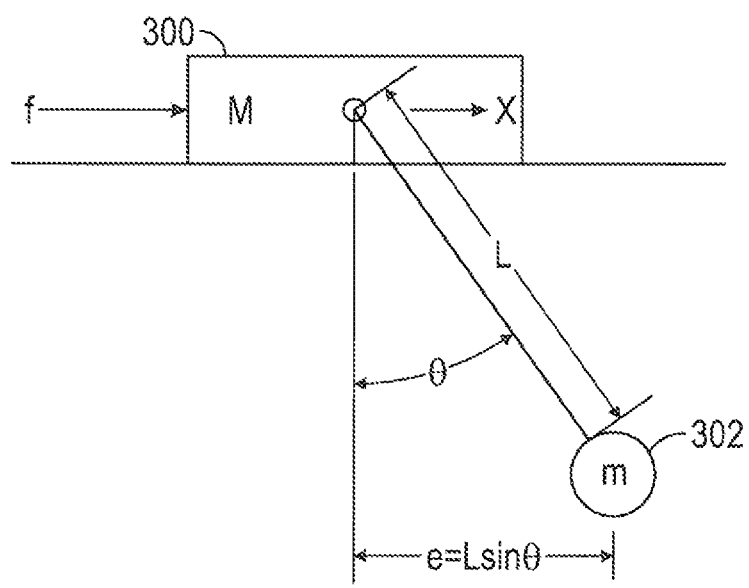
FIG. 8 is a schematic showing a pendulum model utilized for analyzing a horizontal control system for a variable gravity simulator in accord with one possible embodiment of the present invention.

Consider generically the X or Y axis control system with the pendulum model as shown in FIG. 8, where M is the mass of the trolley, m is the mass of the load, $\theta$ is the cable angle, L is the length of the cable, and e is error for the controller. It is assumed that the X, Y, and Z axis are completely uncoupled. For the simple controller this is a valid assumption but it will be shown later that the axes do in fact interact.

Applying a PD controller to the system, $$u=K_p e+K_d \dot{e}$$

where u is the control variable where u=f, but for motor control the control variable may be the motor acceleration. By making small movements and if the cable length L is sufficiently long, then it can be assumed that the force to accelerate trolley 300 is only dependent on the trolley mass M and not load 302 mass m.

$$\ddot{x}=f/M$$

So the control equation becomes $$\ddot{x}=(K_p e+K_d \dot{e})/M$$

However, if the mass of trolley 300 is constant then M can be included in the controller gains Kp and Kd and the control equations becomes $$\ddot{x}=(K_p e+K_d \dot{e})$$

Where from FIG. 8, $e = L \sin \theta$ and $$\dot{e} = \frac{e_n - e_{n-1}}{t_n - t_{n-1}}$$

The controller described in the previous section controls the displacement of trolley 300. The system dynamics and kinematics were not considered. The controller should, in one embodiment, provide a way of regulating pendulum swinging energy. In other words, the trolley 300 (e.g., such as carriage 14) can be moved in the x and y directions to remove the swinging energy from the system, which might be produced by a jumping load, for example. The system is under actuated or has more degrees of freedom than the actuators. The ARGOS system swing energy can be considered like an undamped pendulum.

In this embodiment, a Lyapunov-base nonlinear controller 532 is developed for the ARGOS X and Y axes. Assuming that X and Y axis are completely uncoupled and that the masses are concentrated at the points where the cables connect and that the system is frictionless. The dynamic equations for either the X or Y axis may be obtained by applying Newton's second law or by Lagrange energy methods.

Assuming the cable length is constant the system dynamics are $$\ddot{\theta} = -g\frac{\sin\theta}{L} - \frac{\cos\theta}{L}\ddot{x}$$

where g is the acceleration due to gravity. Converting the above equation to state space form, $$\dot{\omega} = -g\frac{\sin\theta}{L} - \frac{\cos\theta}{L}u$$

Where u is the control variable given by $\ddot{x} = u$

The goal of this controller is to dampen the swinging energy of the pendulum. Consider the total swing energy of the pendulum as $$E(\omega, \theta) = \frac{1}{2}m\omega^2 L^2 + mgL(1 - \cos\theta)$$

The function has a stable minimum at E(0,0) and is positive for all other points in the domain $-\pi/2 \le \theta \le \pi/2$. The above can be used as the positive definite Lyapunov candidate function $V(\omega, \theta)$ in the domain.

The time derivative of V is $\dot{V} = (mgL \sin \theta)\omega + (mL^2\omega)\dot{\omega}$ Then linking the system dynamics with the swing energy by combining equations gives $$\dot{V} = (mgL\sin\theta)\omega + (mL^2\omega)\left(-g\frac{\sin\theta}{L} - \frac{\cos\theta}{L}u\right)$$

Simplifying $\dot{V} = -mL\omega(\cos\theta)u$

Applying Lyapunov-Base techniques, the system will be stable if the above is negative definite for all values of θ and ω. An appropriate control function u can be chosen to meet this criterion for this aspect of the problem. In one embodiment, $u = KmL\omega(\cos\theta)$ Where K is a positive controller gain constant. Combining the above with earlier presented equations to provide an overall control rule for the ARGOS system, $u = KmL\omega(\cos\theta) + K_p L \sin\theta + K_d \dot{e}$ where K, $K_p$, and $K_d$ are controller gains for the linear controller 530 and non-linear controller 532 shown in FIG. 10 that are input into the control panel 400 as discussed hereinafter that affect the magnitude of the gravity field being simulated.

For implementing the above control rule, the following steps, assumptions and measurements are made. Parameter m is the mass of the pendulum 302 and typically does not change and can be easily determined by weighing the test participant or object. The variable L is the length of cable 16 and can be read directly from an encoder on the hoist spool. K, $K_p$, and $K_d$ are controller gains and are determined experimentally through ARGOS system 10 testing. This leaves cos θ, sin θ, ω, and e to be found using the systems feedback devices.

In this example of the invention for gravity simulation purposes, the only feedback device on the X and Y axes is the laser cable angle sensor 18, one possible embodiment of which is shown in FIG. 5. In another embodiment, this device uses a laser measurement to determine the cable displacement at a point approximately 8 inches below the hoist spool centerline. The embodiment of FIG. 5 shows use of two laser sensors instead of the single sensor with fixed pendulum point.

Using a linear approximation, the relationship between laser sensor voltage and cable angle can be determined. Using the cable angle, the values for cos θ and sin θ can be determined. The ARGOS facility 10 maximum and minimum cable angle was calculated to typically be about −3° to 3°. Accordingly, the only solutions for this case to represent the sine and cosine terms in the controller are typically solutions in this maximum and minimum range. In this range, the sine solutions from −3 to 3 are linear or substantially linear. Thus, the final solution can be found by linear approximation of the sine values in this range and used in the final control algorithm.

In the same manner, the cosine solutions can be found. Upon finding the solution to the sin θ and cos θ from −3° to 3°, the value for e and ω shown in above discussed possible embodiment for the control rule can then found using a numerical differentiation method. Finally, the control rule is implemented in the horizontal software. In this embodiment, final gain variable solutions are finalized through testing of the control theory on the ARGOS system 10. This control approach has performed exceptionally well and meets the stability and performance requirements of the ARGOS horizontal system.

Accordingly, the linear PD control 530 (FIG. 10) is derived using Newton's 2nd law of motion. The acceleration term in Newton's 2nd law is isolated to serve as the control input. The horizontal system linear acceleration is essentially a function of the mass and the force to accelerate the mass to reduce or control cable angle generation from the user. In one embodiment, the cable angle generation in the system induces a horizontal displacement and change in horizontal displacement that is constantly reduced in order keep the user or load directly under the drive system. This control design compensates for any linear motion until the user jumps, or begins to swing during operation.

The non-linear control 532 is derived using a Lyapunov-base function. This controller responds to the dynamics and kinematics induced by a jump or swinging motion in the system. The overall concept of this method of non-linear control is to minimize the energy generated as a result of swinging motion. The total energy of the swinging mass can be calculated using the Legrangian total energy equation which correlates the total energy, angular velocity and angular displacement of a hanging mass (e.g. the ARGOS user). If the total energy were plotted then it can be seen that the function has a stable minimum within a 180°spectrum. Thus, this function was used as a positive definite Lyapunov candidate function that provides the conditions necessary to develop a stable non-linear controller.

Figure 9:
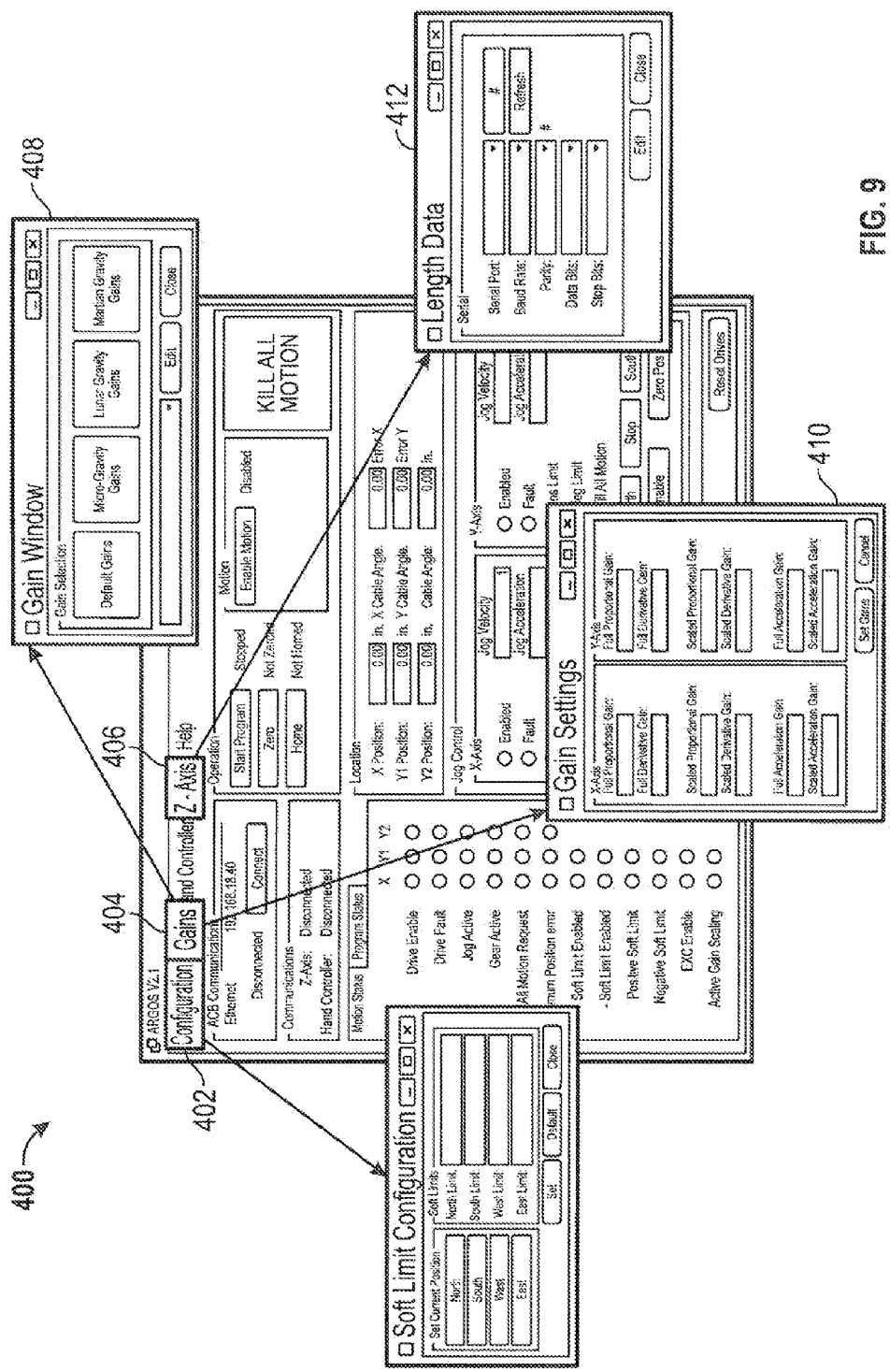
FIG. 9 shows one possible horizontal control interface computer screen that may be utilized for controlling the horizontal control system in accord with one possible embodiment of the invention.

FIG. 9 shows one possible embodiment for a user interface 400 for a horizontal control system. The configuration button 402 can be utilized to set the desired horizontal limits of operation of ARGOS facility 10. Default selections may be utilized or the settings may be manually entered. Validations may be used to guard against errant entries and color indicators may be utilized to ensure data transfer.

The user interface gain button 404 may be utilized to set the desired gain selection for the preferred gravity simulation. For example, quick settings may be utilized to set gains for micro-gravity, lunar, or Mars gravity simulations as indicated in 408. Manual settings for a desired gravity simulation may also be used as indicated in 410.

Figure 10:
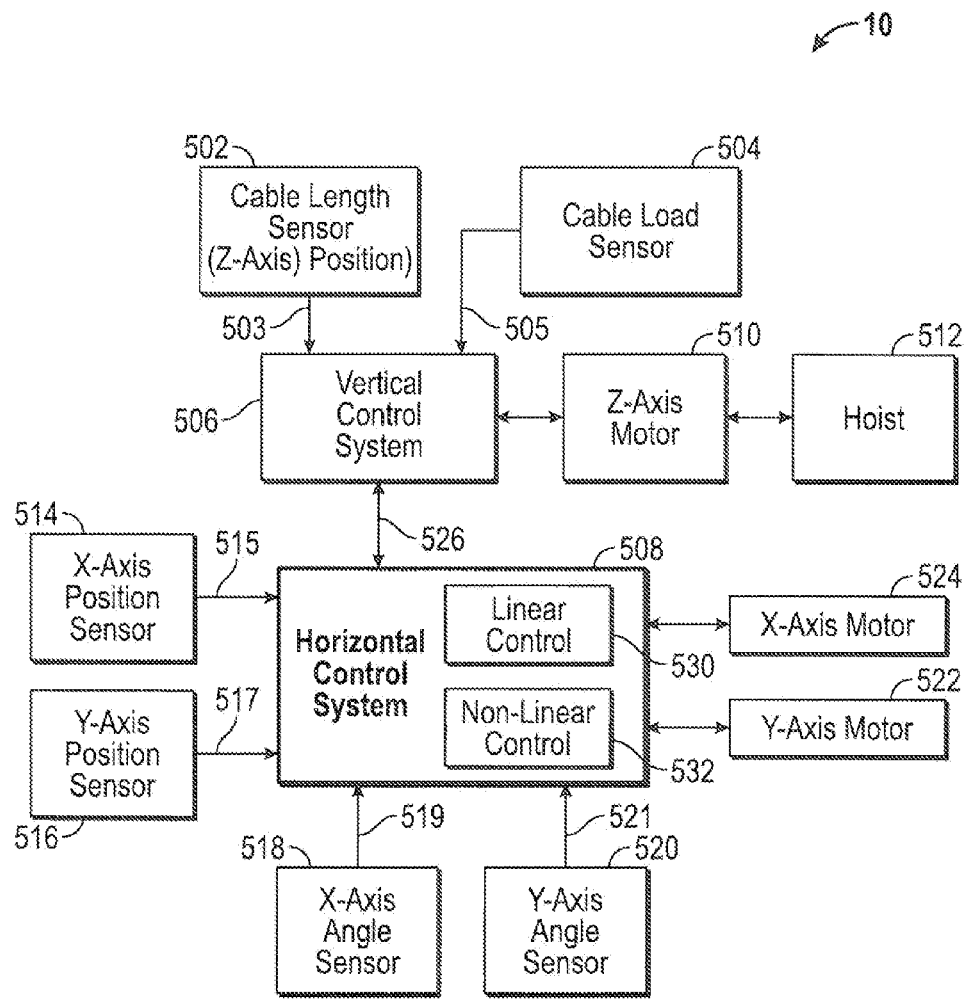
FIG. 10 is a block diagram schematic for one possible embodiment of a variable gravity simulator in accord with one embodiment of the present invention.

The data link, e.g., link 526 shown in FIG. 10, for the length of cable 16 can be controlled with button 406 and menu 412. As discussed above, for the horizontal control equation or rule, the length of the cable is a significant factor for controlling the swing of the cable. As the length of the cable changes for the z-axis motion, this information is fed from the vertical control system to the horizontal control system. The data link 526 may be an RS-232 serial connection between the vertical and horizontal control system and/or other type of communication as desired to provide this information.

FIG. 10 provides a generalized block diagram of system 10. Cable length sensor 502, which may comprise an encoder as part of z-axis motor 510 or hoist 512, produces a cable length signal 503 that provides cable length data 210, 212 shown in FIG. 7. Hoist 512 may also be referred to herein as a spool assembly or winch assembly such as spool or winch assembly 52 in FIG. 5 that is part of carrier 14 of FIG. 3. Load sensor 504, which may comprise load cell 12 of FIG. 6 or 6A, provides load sensor signal 505 that corresponds to load cell or load signal 120 of FIG. 6A, which can also be displayed as force signal 209 or 214 in FIG. 7, for the control panel 200 of vertical control system 506. Vertical control system 506 operates z-axis motor 510, which drives what may be referred to herein as spool or winch or hoist 512.

Horizontal control system 508 receives inputs from multiple sources including cable length information that may be routed via line 526 from vertical control system 506. While vertical control system 506 and horizontal control system 508 may be separate systems, with separate control panels as discussed hereinbefore, and may utilize separate human operators for monitoring the system, and may utilize different computers, the systems may be also merged into a single control system if desired. Other sensor inputs may include x-axis position sensor 514 that provides x-axis position/velocity signal 515 and y-axis position sensor 516 that provides y-axis position/velocity signal of carriage 14. These sensors may preferably be encoders that are incorporated within x-axis motor 524 and one or both y-axis motors 522. Other types of position sensors could be utilized in addition such as limit switches that detect the limits of motion in the x or y direction of carriage 14 on frame 26.

Additional sensor inputs may comprise x-axis angle sensor 518, which produces x-axis angle signal 519, and y-axis angle sensor 520, which produces y-axis angle signal 521. Angle sensors 514 and 516 may comprise laser angle sensors as discussed hereinbefore or other suitable angle sensors. Horizontal control system 508 may comprise linear control 530 and non-linear control 532 for operating x-axis motor 524 and y-axis motor 522 to control movement of carriage 14 as discussed hereinbefore.

While the present invention is described in terms of a gravity simulation system, the present invention may be utilized with systems, hoists, lifts, and the like in various industries such as but not limited to manufacturing lines, recreation, medical environments such as for medical rehabilitation, construction, and the like, to handle or move materials, humans, animals, or the like. Moreover, while some aspects of the present invention are described in Cartesian coordinates, it will be understood that the invention is not limited to any particular coordinate system so that other coordinates are considered to comprise the present invention in terms of standard coordinate translations.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A method for making a three dimensional simulator for a selectable simulated gravity field, comprising:

providing a carriage comprising a cable extending from a spool of said cable, said cable being connectable to a load;

providing a z-axis motor for said spool;

providing an x-axis motor and a y-axis motor operable to move said carriage in an x-axis direction and a y-axis direction, respectively;

providing an angle sensor to determine an angle of said cable with respect to a z-axis;

providing a load sensor to detect a load force for said load on said cable and to responsively produce a load sensor signal;

providing a cable length sensor to measure a length of said cable wherein said length extends from said spool;

providing a vertical control system with a selectable off load target for said selectable simulated gravity field, said load sensor providing feedback for control of said z-axis motor to a digital non-linear filter comprising a first filter and a second filter with a higher cut off frequency than said first filter;

providing a variable weighting factor by comparing a first output of said first filter with a second output of said second filter;

calculating a first combination of said variable weighting factor with said first output of said first filter and a second combination of said variable weighting factor with said second output of said second filter; and computing an output of said digital non-linear filter using said first and second combinations.

2. The method of claim 1, wherein said step of providing said variable weighting factor is based on a difference between said first output of said first filter and said second output of said second filter and a rate of change between said first output of said first filter and said second output of said second filter.

3. The method of claim 2, wherein equations 11.1 and 11.2 shown in FIG. 11 are representative of said first output of said first filter, $f_{loose}[k]$ and said second output of said second filter, $f_{tight}[k]$, respectively.

4. The method of claim 3, wherein equation 12.1 shown in FIG. 12 is representative of said output of said digital non-linear filter, $f_{ATF}$.

5. The method of claim 1, wherein said digital non-linear filter comprises a variable gain that becomes greater than one when said output of said digital non-linear filter lags data from said load sensor or said second output of said second filter by a predetermined amount.

6. The method of claim 5, wherein said variable gain of said digital non-linear filter is limited by said second output of said second filter.

7. The method of claim 1, further comprising providing a horizontal control system operable to utilize said angle sensor and said cable length sensor to control said x-axis motor and said y-axis motor to move said carriage for controlling said angle of said cable with respect to said z-axis wherein said horizontal control system is operable for controlling linear motion and swing energy.

8. The method of claim 7, further comprising providing that said horizontal control system is operable to compensate for swinging of said cable induced by movement of a human load mounted to said cable.

9. The method of claim 7, wherein said horizontal control system utilizes a Lyapunov-based function to minimize said swing energy.

10. The method of claim 7, wherein the horizontal control system utilizes the equation shown in FIG. 13 for controlling linear motion and swing energy.

11. A three-dimensional simulator operable for providing a selectable simulated gravity field for a load, comprising:
   a carriage mounted for horizontal motion, said carriage comprising a spool of cable;
   a length of said cable extending downwardly from said spool, said cable being connectable to said load;
   a z-axis motor operably connected to said spool for controlling said length of said cable extending from said spool in a z-axis direction;
   an x-axis motor and a y-axis motor operable to move said carriage in an x-axis direction and a y-axis direction, respectively, to provide said horizontal motion;
   an angle sensor operable to measure an angle of said cable with respect to said z axis direction;
   a load sensor to detect a load force responsive to said load on said cable and to responsively produce a load sensor signal;
   a cable length sensor to measure said length of said cable extending from said spool;
   a vertical control system for controlling said z-axis motor with a selectable off load target for said selectable simulated gravity field; and
   a horizontal control system configured to utilize said angle sensor and said cable length sensor to control said x-axis motor and said y-axis motor to move said carriage for controlling said angle of said cable with respect to said z-axis direction so that said horizontal control system is operable for controlling linear motion and swing energy.

12. The three-dimensional simulator of claim 11, comprising a digital non-linear filter, said digital non-linear filter comprising a first filter and a second filter with a higher cut off frequency than said first filter, said digital non-linear filter being operable to utilize a variable weighting factor for weighting an output of said digital non-linear filter between a first output of said first filter and a second output of said second filter, said variable weighting factor being based on a difference between said first output of said first filter and said second output of said second filter and rate of change between said first output of said first filter and said second output of said second filter.

13. The three-dimensional simulator of claim 12, wherein said digital non-linear filter comprises a variable gain that conditionally becomes greater than one when said output of said digital non-linear filter lags data from said load sensor by a predetermined amount.

14. The three-dimensional simulator of claim 13, wherein said variable gain is limited by said second output of said second filter.

15. The three-dimensional simulator of claim 12, wherein equations 11.1 and 11.2 shown in FIG. 11 are representative of said first output of said first filter, $f_{loose}[k]$ and said second output of said second filter, $f_{tight}[k]$, respectively.

16. The three-dimensional simulator of claim 15, wherein equation 12.1 shown in FIG. 12 is representative of an output of said non-linear filter, $f_{ATF}$.

17. The three-dimensional simulator of claim 11, further comprising that said horizontal control is configured to reduce swinging energy of said cable induced by movement of a human load mounted to said cable.

18. The three-dimensional simulator of claim 11, wherein said horizontal control utilizes a Lyapunov-based function to minimize said swing energy.

19. The three-dimensional simulator of claim 11, wherein the horizontal control system utilizes the equation shown in FIG. 13 for controlling linear motion and swing energy.

20. A cable angle sensor for a winch assembly comprising a spool of cable and a spool lateral adjustment wherein said spool lateral adjustment is operable for moving said spool of cable to constrain said cable to within a region of error of an exit point of said cable from said winch assembly, said cable angle sensor comprising:
   a first laser sensor operable for detecting a first relative position of said cable;
   a second laser sensor spaced along said cable operable for detecting a second relative position of said cable; and
   a processor configured to determine an angle of said cable with respect to said winch assembly that is corrected with respect to an error of said spool lateral adjustment in maintaining said exit point of said cable from said winch assembly.

21. The cable angle sensor of claim 20, wherein said processor is operable for determining said angle with respect to a vertical reference line.

22. The cable angle sensor of claim 20, wherein said processor is configured to detect error that occurs within said region of error when lateral movement of said cable occurs that is common to both said first laser sensor and said second laser sensor.

23. A method for making a tracking control system, said tracking control system comprising a sensor that provides a sensor signal, said method comprising:
   providing that said sensor signal is operatively connected to a non-linear filter wherein said non-linear filter comprises a first filter and a second filter, said first filter and said second filter each comprising a moving average filter;

providing said first filter with a lower cut-off frequency as compared to said second filter;

providing a weighting by comparing a first output of said first filter with a second output of said second filter;

calculating a first combination by combining said weighting with said first output of said first filter and a second combination by combining said weighting with said second output of said second filter; and using said first and second combinations to compute an output of said non-linear filter.

24. The method of claim 23, further comprising providing that said first filter and said second filter each comprise a zero-lag exponential moving average filter.

25. The method of claim 23, wherein said weighting is based on a difference in said first output and said second output and is also based on a difference in a rate of change of said first output and said second output, when said difference in said first output and said second output is greater than a predetermined amount, then said non-linear filter conditionally has a gain greater than unity.

26. The method of claim 25, wherein said non-linear filter output is limited to said second output.

27. The method of claim 23, wherein equations 11.1 and 11.2 shown in FIG. 11 are representative of said first output of said first filter, $f_{loose}[k]$ and said second output of said second filter, $f_{tight}[k]$, respectively.

28. The method of claim 27, wherein equation 12.1 shown in FIG. 12 is representative of said output of said non-linear filter, $f_{ATF}$.

29. A cable system with a load, comprising:

a carriage;

a cable extending from said carriage connected to said load;

a first motor for moving said carriage in a first horizontal direction;

a second motor for moving said carriage in a second horizontal direction;

an angle sensor operable for producing an angle sensor signal in response to an angle of said cable with respect to a z-axis;

a horizontal control system configured for utilizing said angle sensor signal to operate said first motor and said second motor to control movement of said carriage for controlling said angle wherein said cable system comprises a linear control and a non-linear Lyapunov control operable for controlling both linear displacement and swing energy of said load.

30. The cable system of claim 29, wherein the equation shown in FIG. 13 is representative of said linear control and said non-linear Lyapunov control.

31. The cable system of claim 30, wherein said carriage comprises a hoist operable to vary a length of said cable.

* * * * *